United States Patent
Tang

(10) Patent No.: US 8,068,147 B2
(45) Date of Patent: Nov. 29, 2011

(54) SETTING THE WHITE BALANCE OF A VIDEO FRAME

(75) Inventor: Bei Tang, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 411 days.

(21) Appl. No.: 12/337,839

(22) Filed: Dec. 18, 2008

(65) Prior Publication Data
US 2010/0157160 A1    Jun. 24, 2010

(51) Int. Cl.
*H04N 9/73*    (2006.01)
*G06K 9/00*    (2006.01)

(52) U.S. Cl. .............. 348/223.1; 348/229.1; 382/167

(58) Field of Classification Search .......... 348/655, 348/E9.051, 223.1
See application file for complete search history.

(56) References Cited

U.S. PATENT DOCUMENTS

| | | | |
|---|---|---|---|
| 5,798,943 A * | 8/1998 | Cook et al. ............... | 382/162 |
| 6,889,012 B2 * | 5/2005 | Morimoto ................ | 399/2 |
| 7,184,080 B2 * | 2/2007 | Kehtarnavaz et al. ..... | 348/223.1 |
| 7,190,394 B2 * | 3/2007 | Kaplinsky et al. ......... | 348/223.1 |
| 7,683,966 B2 * | 3/2010 | Kawakami ................ | 348/371 |
| 7,688,468 B2 * | 3/2010 | Hardy ...................... | 358/1.9 |
| 2006/0210153 A1 * | 9/2006 | Sara et al. ................. | 382/165 |
| 2007/0041064 A1 * | 2/2007 | Subbotin ................... | 358/516 |
| 2007/0127093 A1 * | 6/2007 | Kuno ........................ | 358/516 |

* cited by examiner

*Primary Examiner* — Tuan Ho
*Assistant Examiner* — Shahbaz Nazrul

(57) ABSTRACT

Disclosed is a method for setting the white balance of a video frame. The frame is first divided into sub-regions. Those sub-regions determined to be possibly dominantly monochromatic are eliminated from consideration, and the white balance is set by adjusting the color gain of the frame, the adjusting based on the other sub-regions in the frame. A sub-region is determined to be possibly dominantly monochromatic if the difference between its averaged color and each of a set of neutral reference colors is greater than a threshold. If the difference between the averaged color and at least one of the neutral reference colors is less than or equal to the threshold, then the sub-region is still determined to be possibly dominantly monochromatic if that neutral reference color, along with an illuminant type of a previous frame in the video, match closely enough to an element in an ambiguous reference color list.

13 Claims, 7 Drawing Sheets

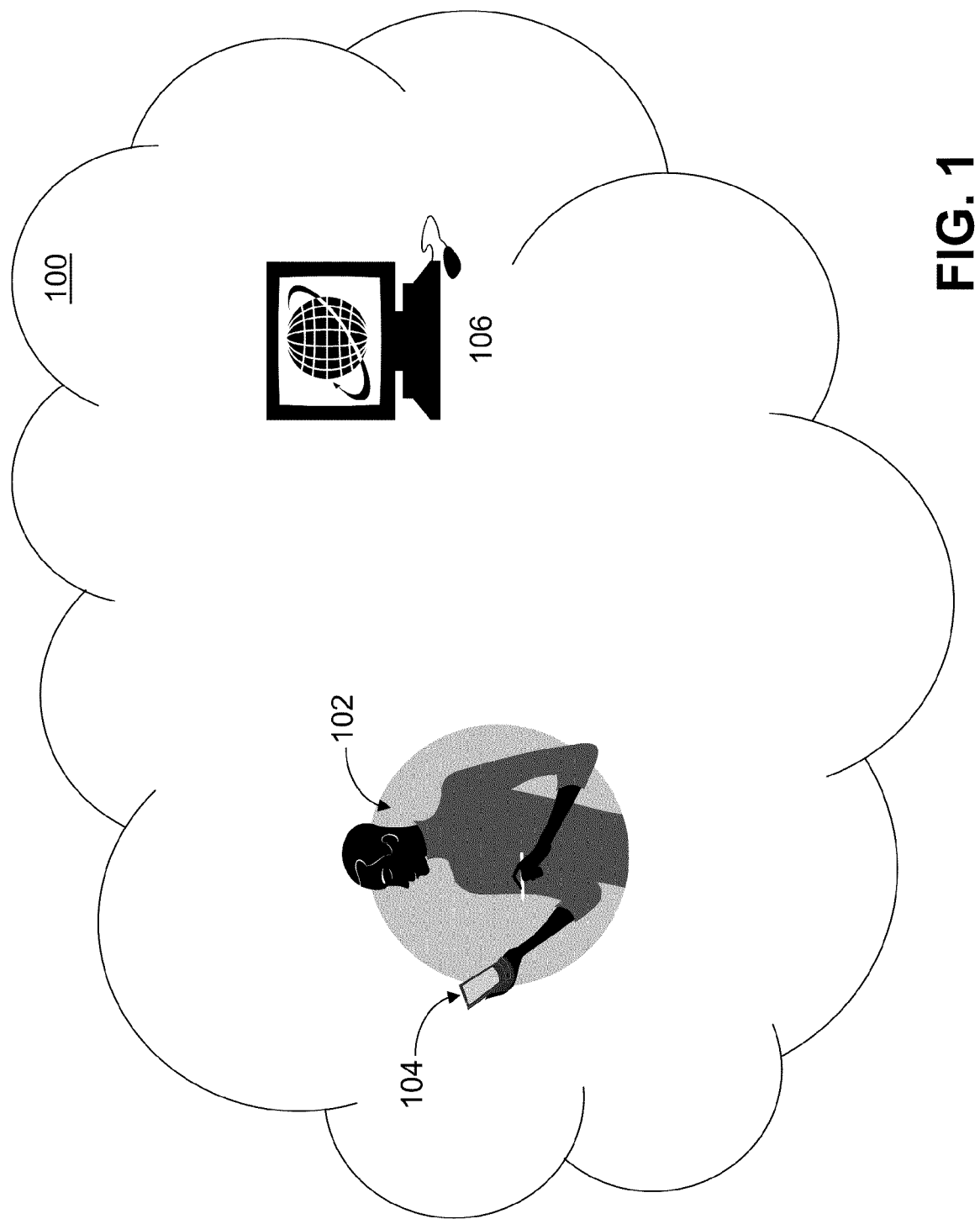

| 300 | Logically divide a video frame into a number of sub-regions. |

| 302 | For each sub-region, compare the averaged color of the sub-region with a predefined set of neutral reference color values. |

| 304 | If the difference between the sub-region's averaged color and each neutral reference color value is greater than a first threshold, then mark the sub-region as possibly dominantly monochromatic. |

| 306 | For each sub-region not yet marked as possibly dominantly monochromatic, for each neutral reference color closer to the sub-region's averaged color than the first threshold, mark the sub-region as possibly dominantly monochromatic if that neutral reference color value and an illuminant of a previous video frame matches an element of an ambiguous color reference list. |

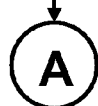

FIG. 3a

308 White balance the video frame based on the sub-regions not marked as possibly dominantly monochromatic.

310 Optionally assign an illuminant type to the video frame based on the predominant illuminant type of the sub-regions not marked as possibly dominantly monochromatic.

| Cb | Cr | Illuminants |
|---|---|---|
| 63 | -40 | Day Lights (around 6500 k) |
| 54 | -35 | |
| 45 | -30 | Cloudy (around 5000 k) |
| 36 | -25 | |
| 27.25 | -20 | Fluorescent Lights (around 4000 k) |
| 18.50 | -15 | |
| 9.75 | -10 | |
| 1 | -5 | |
| -5.20 | 3.20 | |
| -11.40 | 11.40 | |
| -17.60 | 19.60 | Tungsten Lights (below 3000 k) |
| -23.80 | 27.80 | |
| -30 | 36 | |
| -34 | 46 | |
| -39 | 57 | |
| -43 | 67 | |

FIG. 4

| 500 | Compare a neutral reference color with a number of reference colors under a number of illuminants. |

| 502 | Add an ambiguous color point to a list whenever the color value of a reference color under a first illuminant is closer than a threshold to the color value of the neutral reference color under a second illuminant. |

| 1<br>Dark Skin | 2<br>Light Skin | 3<br>Blue Sky | 4<br>Foliage | 5<br>Blue Flower | 6<br>Bluish Green |
|---|---|---|---|---|---|
| 7<br>Orange | 8<br>Purplish Blue | 9<br>Moderate Red | 10<br>Purple | 11<br>Yellow Green | 12<br>Orange Yellow |
| 13<br>Blue | 14<br>Green | 15<br>Red | 16<br>Yellow | 17<br>Magenta | 18<br>Cyan |
| 19<br>White | 20<br>Neutral 8 | 21<br>Neutral 6.5 | 22<br>Neutral 5 | 23<br>Neutral 3.5 | 24<br>Black |

FIG. 6

SETTING THE WHITE BALANCE OF A VIDEO FRAME

FIELD OF THE INVENTION

The present invention is related generally to video processing and, more particularly, to setting the white balance of a video frame.

BACKGROUND OF THE INVENTION

The colors in an image vary depending upon the nature of the light illuminating the image. A white sheet of paper, for example, should look yellow under a yellow light bulb. In general, this is because different sources of illumination (e.g., sunlight on a clear day, overcast sunlight, fluorescent light, incandescent light) produce light with different "power spectra," that is, with light of different colors having different intensities.

Human visual perception, however, does not slavishly follow variations in illumination. The human eyes and brain, knowing that a sheet of paper is white, automatically adjust the "white balance" of the perceived image of the paper. Due to this white balancing, the human consciously perceives the paper as white even under a wide variety of illumination types.

To make a camera image look "natural," the colors in the image must be adjusted to match the human brain's white-balancing procedures. Colors in the image are adjusted by adjusting the gains of the three primary colors in the camera's light sensors. Adjusting white-balance semi-manually is relatively easy: A pure white card is placed before the camera, and the camera zooms in until the white card occupies the camera's full field of view. A button is pushed which tells the camera to adjust its color gain until the image is pure white.

User-friendly cameras, of course, perform white-balancing automatically. To summarize some very complicated procedures, the camera makes an assumption about the colors in an image. For example, the camera often assumes that the average intensities of the primary color channels (e.g., Red, Green, and Blue) are equal in the image. These automatic white-balancing procedures have difficulty, however, with images that violate the camera's assumptions, for example, images that have an intrinsic color cast or that have a large monochromatic area, such as a close-up of a human face or a landscape with a wide stretch of blue sky. When an image violates the camera's assumptions about the colors in the image, the camera's white-balancing operations are thrown off and give an undesirable "color twist" to the image.

BRIEF SUMMARY

The above considerations, and others, are addressed by the present invention, which can be understood by referring to the specification, drawings, and claims. According to aspects of the present invention, the white balance of a video frame is automatically set. The video frame is first divided into sub-regions. Those sub-regions determined to be possibly dominantly monochromatic are eliminated from consideration, and the white balance is set by adjusting the color gain of the video frame, the adjusting based on the other sub-regions in the video frame.

In some embodiments, a sub-region is determined to be possibly dominantly monochromatic if the difference between its averaged color and each of a set of neutral reference colors is greater than a set threshold. If the difference between the averaged color and at least one of the neutral reference colors is less than or equal to the threshold, then the sub-region is still determined to be possibly dominantly monochromatic if that neutral reference color, along with an illuminant type of a previous frame in the video, match closely enough to an element in an ambiguous reference color list.

The color values in the neutral reference color set are defined under a plurality of possible lighting conditions.

In some embodiments, the ambiguous color reference list is created by comparing a neutral reference color with several reference colors under several different illumination conditions. An ambiguous color point is found wherever the difference between a reference color under a first illumination condition and the color value of the neutral reference color under a second illumination condition is less than a threshold.

In some embodiments, the illuminant type of a video frame is set to be the illuminant type of a neutral reference color that is closest to the greatest number of non-dominantly monochromatic sub-regions in the frame.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIG. 1 is an overview of a representational environment in which the present invention may be practiced;

FIGS. 3a and 3b together form a flowchart of an exemplary method for white balancing a video frame;

FIG. 4 is a table showing the values of an exemplary set of neutral reference colors;

FIG. 6 is a table of the well known Macbeth colors.

DETAILED DESCRIPTION

Figure 2C:
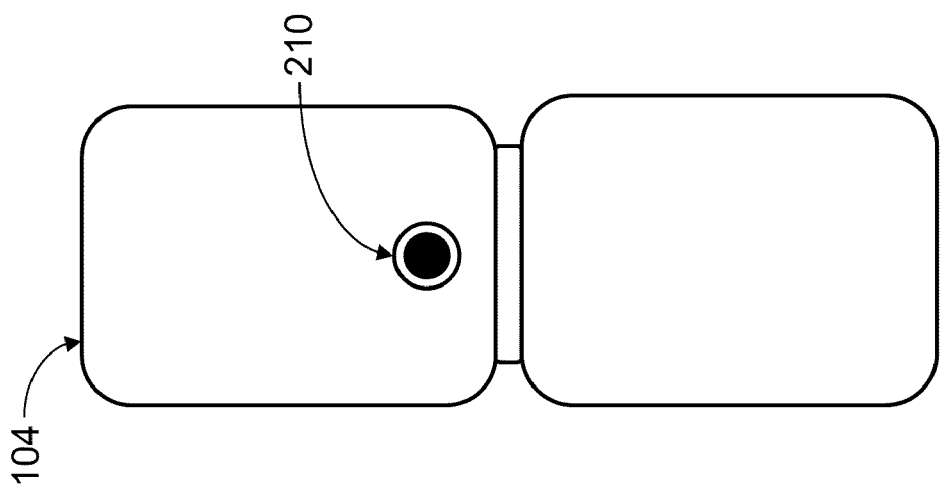
FIGS. 2a, 2b, and 2c are simplified schematics of a personal communication device that supports video white balancing.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

In FIG. 1, a communications environment 100 supports a user 102 working with his personal communication device 104. The user 102 is shooting video with a camera on the device 104. According to aspects of the present invention, the video images captured by the device 104 are white-balanced in order to look natural. Specific aspects of the present invention are used to prevent the white-balancing from color-twisting those video images that have an intrinsic color cast or that contain a large area that is substantially monochromatic.

The methods of the present invention can be performed locally on the personal communication device 104 itself, or on a remote computing server 106, or in cooperation between the two. Specifically, the server 106 can calculate data structures (such as the ambiguous color reference list, see FIG. 5 and accompanying discussion below) and make them available to the device 104. The scope of the present invention is not limited and can be applied to any device that collects or processes digital video images.

Figure 2B:
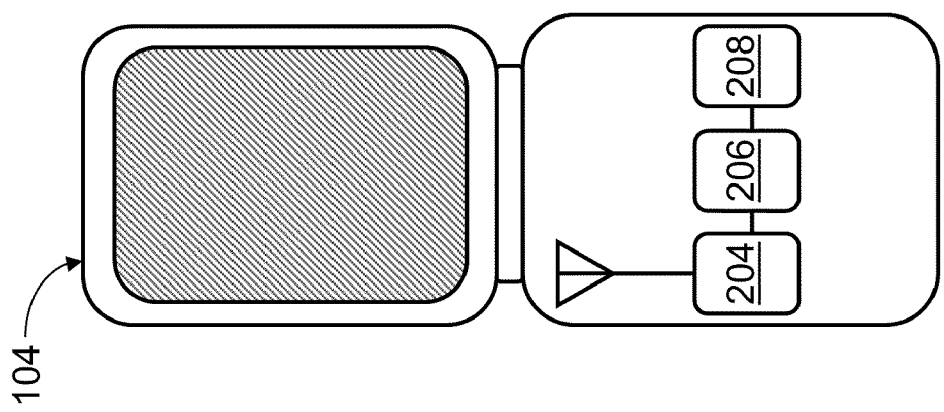
Figure 2A:
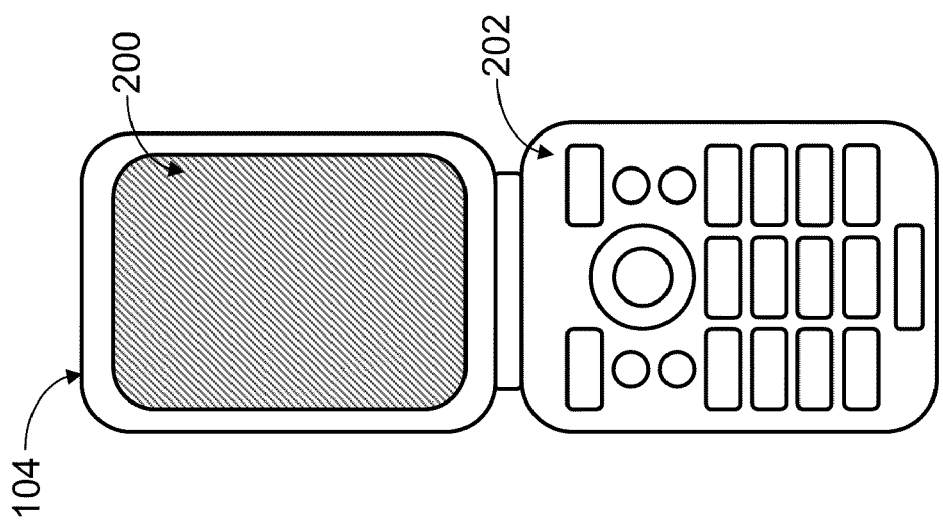

FIGS. 2a, 2b, and 2c show a personal communication device 104 (e.g., a cellular telephone, personal digital assistant, personal computer, digital camera, or anything containing a digital camera) that incorporates an embodiment of the present invention. FIGS. 2a and 2b show the device 104 as a cellular telephone in an open configuration, presenting its main display screen 200 to the user 102. Typically, the main display 200 is used for most high-fidelity interactions with the user 102. For example, the main display 200 is used to show video or still images, is part of a user interface for changing configuration settings, and is used for viewing call logs and contact lists. To support these interactions, the main display 200 is of high resolution and is as large as can be comfortably accommodated in the device 104. A device 104 may have a second and possibly a third display screen for presenting status messages. These screens are generally smaller than the main display screen 200. They can be safely ignored for the remainder of the present discussion.

The typical user interface of the personal communication device 104 includes, in addition to the main display 200, a keypad 202 or other user-input devices. When the device 104 is a digital camera, the user interface is oriented toward taking still pictures and videos.

FIG. 2b illustrates some of the more important internal components of the personal communication device 104. The device 104 includes a communications transceiver 204, a processor 206, and a memory 208. A microphone (or two) and a speaker are usually present.

FIG. 2c shows the other or "outside" face of the personal communication device 104. On this side, the device 104 includes a camera 210.

According to some aspects of the present invention, regions of a video frame that are predominantly monochromatic are ignored during a process of white balancing that video frame. By ignoring these predominantly monochromatic areas, the white-balancing procedure is not skewed.

Figure 3B:
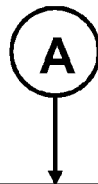

To apply this insight, FIGS. 3a and 3b together present an exemplary method for white-balancing a video frame. The video frame is captured prior to the beginning of this method. Also prior to the beginning of this method, some data structures are created. These data structures are described where appropriate in the following discussion.

In step 300 of FIG. 3a, the video frame is divided into a number of sub-regions. Various techniques, of varying complexity, are available for performing this step. At one extreme, for example, the color values of the pixels are examined and compared, and sub-regions are defined as contiguous areas that are mostly monochromatic. However, this method involves a great deal of processing. Experiments have shown that a much simpler method, e.g., dividing the video frame into a number of fixed-size rectangles, works very well. In a current preferred embodiment, the video frame is divided into twelve columns by sixteen rows, yielding 192 fixed-size rectangles. While other embodiments can use a greater number of fixed-size rectangles, the preferred embodiment has proven to be a good trade-off between acceptable white-balancing results and the increased processing required for an increased numbers of rectangles.

Having defined the sub-regions of the video frame in step 300, steps 302, 304, and 306 of FIG. 3a attempt to discover which of the sub-regions (if any) are predominantly monochromatic so that they can be ignored during the white-balancing process in step 308 of FIG. 3b.

Step 302 begins by calculating an averaged color for each sub-region of the video frame. Many ways are known in the art for calculating an averaged color. For example, the pixels in the sub-region are examined, and statistical information regarding the Red, Green, and Blue values of the pixels is gathered. By averaging the statistics, a point in YCbCr color space is found that represents the statistical averaged color of the pixels in the sub-region. (YCbCr is a well known three-dimensional color space. It is an alternative to the R(ed)G(reen)B(lue) color space. Y is the brightness or luma value; Cb is Blue minus Y; Cr is Red minus Y. An advantage of YCbCr over RGB is that it allows the luma component Y to be stored with high resolution, while the chroma components Cb and Cr are compressed to lower resolution. This closely matches the acuity of the human visual system which is much more sensitive to levels of black and white than to color distinctions.)

The calculated averaged color of the sub-region of the video frame is then compared with a set of neutral reference color values. In a preferred embodiment, the neutral reference color values are a small set of neutral colors, each standing for a gray color value taken under a different illuminant. In a preferred embodiment, a set of sixteen neutral gray reference colors under four illumination groups (day lights, cloudy lights, fluorescent lightings, tungsten lightings) has been defined. These sixteen colors and their illuminant types are listed in the table of FIG. 4. Experiments have shown that embodiments of the present invention work very well with this small set of neutral reference colors, making these embodiments easy to implement in a video processing system of limited capabilities. Other sets of reference colors can also be used.

In step 304, a first filtering test is performed on all of the sub-regions to see which of them may be dominantly monochromatic. The Euclidean distances in the color space from the sub-region's averaged color to each of the neutral reference colors are calculated and compared against a threshold. If at least one of the distances is less than the threshold (that is, if the averaged color of the sub-region is "close" to one of the neutral reference colors), then this sub-region is probably not dominantly monochromatic (but see step 306 below). If, however, all of the distances are greater than the threshold (that is, if the averaged color of the sub-region is not "close" to any of the neutral reference colors), then this sub-region is marked as possibly dominantly monochromatic. This reasoning is based on the observation that if the averaged color of the sub-region is close to one of the neutral reference colors, then the pixels in the sub-region probably contain a variety of colors that average out to a value near a neutral reference color, and thus, the sub-region is probably not dominantly monochromatic.

The method proceeds to step 306 where a second filtering test is performed on those sub-regions of the video frame that were not marked as possibly dominantly monochromatic in step 304. Because these sub-regions were not "caught" in the first filtering test of step 304, it is known that the averaged color of each of these sub-regions is "close" to (that is, within the first threshold of) at least one of the neutral reference colors. Step 306 tests each neutral reference color found to be close to the averaged color of the sub-region, along with an illuminant assigned to the previous frame in the video, against the elements of an "ambiguous color reference list." (Step 310 of FIG. 3b, discussed below, assigns the illuminant value to this previous frame of the video.) (Embodiments of a method for creating the ambiguous color reference list are discussed below in reference to FIG. 5.) When the combination of that "close" neutral reference color and the illuminant of the previous video frame is "close" enough to an element of the ambiguous color reference list (that is, within a second threshold), then this sub-region of the video frame is marked as possibly dominantly monochromatic. The reasoning here is that the averaged color of a dominantly monochromatic sub-region can "accidentally" look like a neutral reference color under specific lighting situations. Those regions are "caught" in the filtering test of step 306 and are marked as possibly dominantly monochromatic.

After all of the sub-regions of the video frame have been examined for possibly dominant monochromaticity, then in step 308 of FIG. 3b the video frame is white balanced. The sub-regions of the video frame that were marked as possibly dominantly monochromatic either under the first filtering test (step 304 of FIG. 3a) or under the second filtering test (step 306) are not considered in this white balancing. The color values of the remaining sub-regions are considered, and the color gains for the video frame are adjusted according to any well known technique for white balancing (e.g., the gray-world assumption or the white-world assumption). In some embodiments, if the number of sub-regions (or the total area of the sub-regions if they are not all of the same size) that were not marked as possibly dominantly monochromatic is too small, then the video frame is not white balanced at all, and the color gains for the video frame are left unchanged.

Thus, the method of FIGS. 3a and 3b applies standard white balancing techniques to a video frame, but the white balancing is based only on those regions of the video frame that are not marked as possibly dominantly monochromatic. Experience has shown that this markedly reduces "color twist" caused by a naive application of white balancing to video frames that contain large monochromatic areas.

An illuminant type is assigned to the video frame in step 310. To do this, the averaged colors of all of the sub-regions that were not marked as possibly dominantly monochromatic are considered and compared against the neutral reference colors. The neutral reference color that is "closest" to the greatest number of averaged colors of these sub-regions is found. Then the illuminant type of that closest neutral reference color is assigned as the illuminant type of the video frame.

Figure 5:
FIG. 5 is a flowchart of an exemplary method for creating an ambiguous color reference list.

FIG. 5 presents one way to create the ambiguous color reference list used in step 306 of FIG. 3a. The ambiguous color reference list is expected to be created in an off-line process, possibly on the remote computing server 106. In step 500, a neutral reference color is compared against a number of reference colors under a number of illuminants. (In most embodiments, the set of neutral reference colors is the same set as used in step 302 of FIG. 3a.) An ambiguous color is found in step 502 whenever the color value of a monochromatic color in one illuminant (call it Illuminant A) "closely" matches the color value of the neutral reference color in a different illuminant (call it Illuminant B). A variety of techniques are available for storing the ambiguous color point. In one embodiment, Illuminant A is stored along with the reference neutral color in Illuminant B.

The well known Macbeth color set includes twenty-four colors that are very commonly seen. FIG. 6 is a table of the Macbeth colors, giving their names. Using the Macbeth colors and the neutral reference color set shown in the Table of FIG. 4, the ambiguous color list includes:
  "Orange" (color 7 on the standard Macbeth color chart) under the 6500 k illuminant group is "close to" (that is, is ambiguous with respect to) the (Cb=−43; Cr=67) neutral reference color in FIG. 4 under the below 3000 k illuminant group;
  "Light Skin" (Macbeth color 2) and "Dark Skin" (Macbeth color 1) under the 6500 k illuminant group are close to the (Cb=−43; Cr=67) neutral reference color under the below 3000 k illuminant group; and
  "Blue Sky" (Macbeth color 3) and "Blue Flower" (Macbeth color 5) under the 4000 k illuminant group are close to the (Cb=54; Cr=−35) and (Cb=45; Cr=−30) neutral reference colors under the 6500 k illuminant group.

Different embodiments of the neutral reference color set, the standard reference colors, and the thresholds lead to a different ambiguous reference color set.

In view of the many possible embodiments to which the principles of the present invention may be applied, it should be recognized that the embodiments described herein with respect to the drawing figures are meant to be illustrative only and should not be taken as limiting the scope of the invention. For example, different neutral reference colors may be called for in various environments. Therefore, the invention as described herein contemplates all such embodiments as may come within the scope of the following claims and equivalents thereof.

I claim:

1. A method on a personal communications device for setting a white balance in a frame of a video, the video comprising a previous frame, the method comprising:
  receiving, by the personal communications device, the video and an ambiguous color reference list;
  logically dividing, by the personal communications device, the frame into a plurality of sub-regions;
  for each sub-region, comparing, by the personal communications device, an averaged color of pixels in the sub-region with a set of neutral reference color values predefined under a plurality of lighting conditions and determining that the sub-region is possibly dominantly monochromatic if a difference between the averaged color of the sub-region pixels and each color value in the neutral reference color set is greater than a first threshold;
  for each sub-region not determined to be possibly dominantly monochromatic, for each color value in the neutral reference color set whose difference from the averaged color of the sub-region pixels is less than or equal to the first threshold, determining, by the personal communications device, that the sub-region is possibly dominantly monochromatic if the neutral reference color value and an illuminant type of a previous frame matches, within a second threshold, an element of the ambiguous color reference list; and
  white balancing the frame based on sub-regions determined not to be possibly dominantly monochromatic.

2. The method of claim 1 further comprising:
  white balancing the frame only if a total area of sub-regions determined to be possibly dominantly monochromatic is less than a third threshold, wherein the third threshold is a percentage of a total area of the frame.

3. The method of claim 1 wherein white balancing comprises adjusting color gains based, at least in part, on averaged colors of the sub-regions determined not to be possibly dominantly monochromatic.

4. The method of claim 1 wherein white balancing is based, at least in part, on a gray-world assumption for sub-regions not determined to be possibly dominantly monochromatic.

5. The method of claim 1 further comprising:
  for each sub-region determined not to be possibly dominantly monochromatic, incrementing a counter for the sub-region's illuminant type; and
  after proceeding through all sub-regions of the frame determined not to be possibly dominantly monochromatic, assigning an illuminant type of the frame to be an illuminant type with a highest counter.

6. The method of claim 1 further comprising:
repeating the method for a next frame of the video.

7. The method of claim 1 further comprising:
creating the ambiguous color reference list, the creating comprising:
comparing a neutral reference color with a plurality of reference colors under a plurality of illuminants; and
based, at least in part, on the comparing, creating the list of ambiguous color points, wherein each element of the list indicates a reference color under a first illuminant that has a color value whose difference from a color value of the neutral reference color under a second illuminant is less than a fourth threshold.

8. The method of claim 7 wherein the reference colors comprise Macbeth colors.

9. The method of claim 7 wherein illuminants comprise lightings with different color temperatures selected from the group consisting of: day lighting, cloudy lighting, fluorescent lighting, and tungsten lighting.

10. A personal communication device comprising:
a memory configured for storing a frame of a video, a previous frame of the video, and an ambiguous color reference list;
a processor operatively coupled to the memory and configured for logically dividing the frame into a plurality of sub-regions, for each sub-region, for comparing an averaged color of pixels in the sub-region with a set of neutral reference color values predefined under a plurality of lighting conditions and for determining that the sub-region is possibly dominantly monochromatic if a difference between the averaged color of the sub-region pixels and each color value in the neutral reference color set is greater than a first threshold, for each sub-region not determined to be possibly dominantly monochromatic, for each color value in the neutral reference color set whose difference from the averaged color of the sub-region pixels is less than or equal to the first threshold, determining that the sub-region is possibly dominantly monochromatic if the neutral reference color value and an illuminant type of a previous frame matches, within a second threshold, an element of an ambiguous color reference list, and for white balancing the frame based on sub-regions determined not to be possibly dominantly monochromatic; and
a transceiver operatively coupled to the memory and to the processor and configured for receiving the video and the ambiguous color reference list.

11. The personal communication device of claim 10 wherein white balancing comprises adjusting color gains based, at least in part, on averaged colors of the sub-regions determined not to be possibly dominantly monochromatic.

12. The personal communication device of claim 10 wherein the processor is further configured for:
for each sub-region determined not to be possibly dominantly monochromatic, incrementing a counter for the sub-region's illuminant type; and
after proceeding through all sub-regions of the frame determined not to be possibly dominantly monochromatic, assigning an illuminant type of the frame to be an illuminant type with a highest counter.

13. The personal communication device of claim 10 wherein the processor is further configured for:
creating the ambiguous color reference list, the creating comprising:
comparing a neutral reference color with a plurality of reference colors under a plurality of illuminants; and
based, at least in part, on the comparing, creating the list of ambiguous color points, wherein each element of the list indicates a reference color under a first illuminant that has a color value whose difference from a color value of the neutral reference color under a second illuminant is less than a third threshold.

* * * * *